US012770386B2

(12) United States Patent
Kim et al.

(10) Patent No.: US 12,770,386 B2
(45) Date of Patent: Oct. 20, 2026

(54) IMAGE PROCESSING APPARATUS AND METHOD FOR DISTINGUISHING BETWEEN AN AREA OF INTEREST AND AN AREA OF NON-INTEREST IN AN IMAGE

(71) Applicant: HYUNDAI MOBIS CO., LTD., Seoul (KR)

(72) Inventors: Sung Soo Kim, Yongin-si (KR); June Young Jung, Yongin-si (KR); Hyeon Jung Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 210 days.

(21) Appl. No.: 18/766,560

(22) Filed: Jul. 8, 2024

(65) Prior Publication Data

US 2025/0029377 A1 Jan. 23, 2025

(30) Foreign Application Priority Data

Jul. 20, 2023 (KR) ........................ 10-2023-0094552

(51) Int. Cl.
*G06V 10/82* (2022.01)

(52) U.S. Cl.
CPC .................................... *G06V 10/82* (2022.01)

(58) Field of Classification Search
None
See application file for complete search history.

(56) References Cited

U.S. PATENT DOCUMENTS

2017/0169313 A1* 6/2017 Choi ...................... G06V 10/82
2020/0143204 A1* 5/2020 Nakano .................. G06V 10/82
2023/0186638 A1* 6/2023 Klingenhöfer ............ G06T 7/50
382/104

* cited by examiner

*Primary Examiner* — Andrew H Lam
(74) *Attorney, Agent, or Firm* — DLA PIPER LLP US

(57) ABSTRACT

An image processing apparatus and method. For example, an image processing apparatus for distinguishing between an area of interest and an area of non-interest in an image, the image processing apparatus comprises: a memory configured to store a second image including information on an area of non-interest, an area of interest, and a variable area; a receiver configured to receive a first image captured from at least one camera; and a processor including an artificial intelligence model trained to distinguish objects in an area of interest of the first image from a input data, consisting of the second image and the first image, wherein the processor extracts information on an area of non-interest from a resultant image, outputted by the artificial intelligence model, and updates a size of the variable area of the second image using an extracted information on the area of non-interest.

13 Claims, 10 Drawing Sheets

<Case 1>

<Case 2>

IMAGE PROCESSING APPARATUS AND METHOD FOR DISTINGUISHING BETWEEN AN AREA OF INTEREST AND AN AREA OF NON-INTEREST IN AN IMAGE

CROSS-REFERENCE TO RELATED APPLICATION

The present application claims priority to and the benefit of Korean Patent Application No. 10-2023-0094552, filed on Jul. 20, 2023, the entire disclosure of which is incorporated herein by reference.

TECHNICAL FIELD

The present disclosure relates to an image processing apparatus and method.

BACKGROUND

The content described in the present section simply provides background information for the present disclosure and does not constitute prior art.

Image object recognition in an autonomous driving vehicle means a technology for analyzing a surrounding image of the vehicle and recognizing objects such as roads, lanes, obstacles, and pedestrians. The autonomous driving vehicle may provide a safe and accurate traveling environment by utilizing an image object recognition technology. The image object recognition technology in an autonomous vehicle may be applied through the following process. Images are collected and preprocessed. Objects in the preprocessed image are detected and the detected objects are separated. The separated objects are tracked and meanings of the objects are interpreted for a determination of traveling.

In object recognition based on an image processing apparatus and/or method of the related art, an area of non-interest is defined in advance and processing is performed. In the image processing apparatus and/or method of the related art, a size of the area of non-interest is defined to be larger than that of a vehicle to eliminate an error that occurs when surroudning images of the vehicle are combined. However, because the size or position of the area of non-interest may change after the vehicle is shipped, there is a limit to defining the area of non-interest in advance and performing processing. For example, even though an object with a low probability of actually colliding with the vehicle is detected, the object may be incorrectly recognized as an object with a high probability of colliding, and incorrect information may be provided to a driver. Or, an amount of information provided to the driver is reduced. Such image processing apparatus and/or method may result in lower quality of object recognition.

To improve an image processing apparatus and/or method of the related art, SSEG (Semantic Segmentation) based on a learning model that classifies boundaries between objects may be used. SSEG is an image-based learning model that divides objects in an image in units of pixels. SSEG may be used to recognize a space and recognize lanes or obstacles in an autonomous vehicle. However, there is a problem that it is impossible to accurately distinguish between an area of non-interest and an area of interest using only a basic structure of SSEG. For example, when a road around the vehicle is reflected on a painted surface of a car body, SSEG cannot accurately distinguish between the area of non-interest and the area of interest.

SUMMARY

In view of the above, the present disclosure is intended to solve these problems, and a main object of the present disclosure is to accurately distinguish between an area of non-interest and an area of interest by inputting an image providing additional information along with an existing input image to an artificial intelligence model.

Further, another main object of the present disclosure is to minimize a negative impact on performance for other classes by inputting an existing input image to an artificial intelligence model without changing the existing input image.

Further, yet another main object of the present disclosure is to accurately distinguish between an area of non-interest and an area of interest and secure the maximum number of objects present around a vehicle by updating additional information in real time and inputting the information to an artificial intelligence model.

The problems to be solved by the present disclosure are not limited to the problems mentioned above, and other problems not mentioned can be clearly understood by those skilled in the art from the description below.

An embodiment of the present disclosure provides an image processing apparatus for distinguishing between an area of interest and an area of non-interest in an image, the image processing apparatus comprises: a memory configured to store a second image including information on an area of non-interest, an area of interest, and a variable area; a receiver configured to receive a first image captured from at least one camera; and a processor including an artificial intelligence model trained to distinguish objects in an area of interest of the first image from a input data, consisting of the second image and the first image, wherein the processor extracts information on an area of non-interest from a resultant image, outputted by the artificial intelligence model, and updates a size of the variable area of the second image using an extracted information on the area of non-interest.

Another embodiment of the present disclosure provides an image processing method of distinguishing between an area of interest and an area of non-interest in an image using an image processing apparatus, the image processing method comprising: receiving a first image captured from at least one camera; preprocessing the first image and a second image that including information on an area of non-interest, an area of interest, and a variable area; inputting a preprocessed data, comprising the first image and the second image, into an artificial intelligence model; outputting a resultant image from the artificial intelligence model; extracting information on an area of non-interest from the resultant image; and updating a size of the variable area of the second image using an extracted information on the area of non-interest, wherein the artificial intelligence model is trained to distinguish objects in the area of interest of the first image from an input data comprising the second image and the first image.

As described above, according to the present embodiment, there is an effect that it is possible to accurately distinguish between an area of non-interest and an area of interest by inputting an image providing additional information along with an existing input image to an artificial intelligence model.

Further, according to the present embodiment, there is an effect that it is possible to minimize a negative impact on performance for other classes by inputting an existing input image to an artificial intelligence model without changing the existing input image.

Further, according to the present embodiment, there is an effect that it is possible to accurately distinguish between an area of non-interest and an area of interest and secure the maximum number of objects present around a vehicle by updating additional information in real time and inputting the information to an artificial intelligence model.

DETAILED DESCRIPTION

Figure 1:
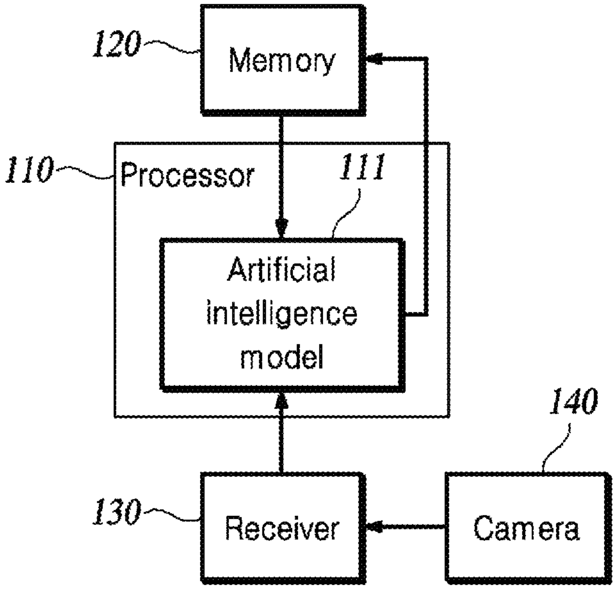
FIG. 1 is a block diagram of an image processing apparatus according to various embodiments of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

Unless otherwise noted, the description of one embodiment is intended to be applicable to other embodiments.

The following detailed description, together with the accompanying drawings, is intended to describe exemplary embodiments of the present invention and is not intended to represent the only embodiments in which the present invention may be practiced.

The following detailed description, together with the accompanying drawings, is intended to describe exemplary embodiments of the present invention and is not intended to represent the only embodiments in which the present invention may be practiced.

FIG. 1 is a block diagram of an image processing apparatus according to various embodiments of the present disclosure.

Referring to FIG. 1, an image processing apparatus according to various embodiments of the present disclosure may include all or some of a receiver 130, a memory 120, and a processor 110.

The receiver 130 may receive a first image captured from at least one camera

140. The camera 140 is mounted on a vehicle and may capture a surrounding image of the vehicle. For example, the first image may include some objects like roads, trees, other vehicles, people and buildings. The camera 140 may be configured to capture a wide-angle image.

The memory 120 may store the second image. The second image may include information on an area of non-interest, an area of interest, and a variable area. The area of non-interest refers to an unnecessary area in an area that is an object separation target in the first image. For example, the area of non-interest may be a partial area of the vehicle on which the camera 140 is mounted, an area occupied by an object attached to the vehicle by the driver, or the like. More detailed description of the area of non-interest will be described later with reference to FIG. 6. The area of interest is an area that is an object separation target in the first image. The variable area is an area that may be changed into the area of interest or the area of non-interest according to a determination of an artificial intelligence model (AI model) 111.

The processor 110 may include the artificial intelligence model 111. The artificial intelligence model 111 may be trained to distinguish or to recognize objects in an area of interest of the first image from a input data, consisting of the second image and the first image, and to separate an object in the area of interest of the first image. The artificial intelligence model 111 is SSEG (Semantic Segmentation) and may be trained using an artificial neural network model. Here, the artificial neural network model may be any one of U-Net (Universal Network), V-Net (Vision Network), ResNet (Residual Network), DenseNet (Densely Connected Convolutional Network), InceptionNet (Inception Network), ShuffleNet, MobileNet, EfficientNet, and Swin Transformer. CNN (Convolutional Neural Network), LSTM (Long Short-Term Memory), and RNN (Recurrent Neural Network).

The processor 110 may extract information on the area of non-interest from the resultant image, outputted from the artificial intelligence model 111. The processor 110 may update a size of the variable area of the second image using the extracted information on the area of non-interest. Various embodiments in which the processor 110 updates the size of the variable area of the second image will be described later with reference to FIGS. 2 to 5.

Figure 2:
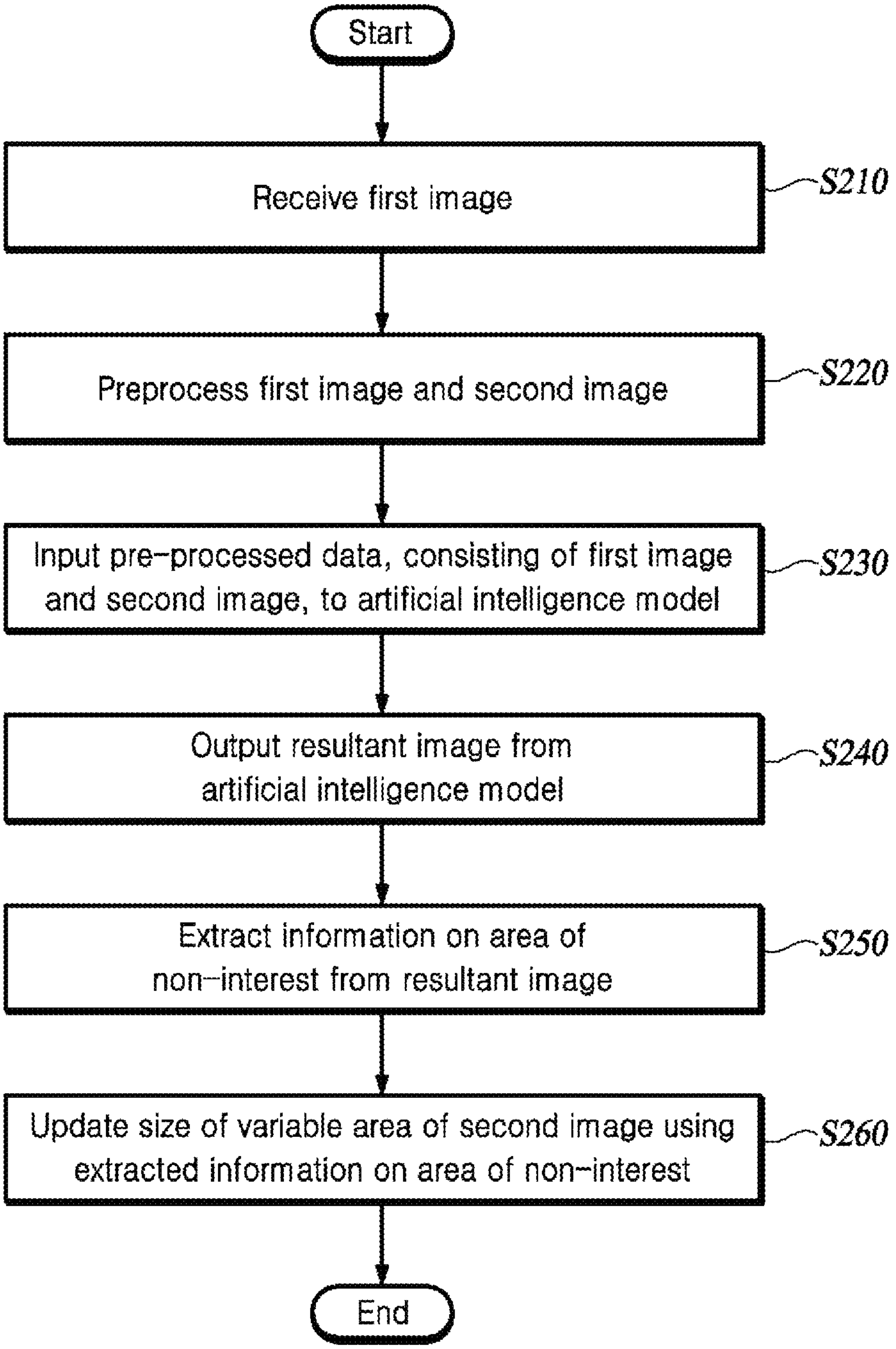
FIG. 2 is a flowchart illustrating an image processing method according to various embodiments of the present disclosure.

FIG. 2 is a flowchart illustrating an image processing method according to various embodiments of the present disclosure.

Referring to FIG. 2, the image processing apparatus according to various embodiments of the present disclosure may receive the first image from at least one camera 140 (S210).

The image processing apparatus may preprocess the first image, and the second image which is previously stored in the memory 120 (S220). Here, preprocessing means processing the first image and the second image into a form that is easy to input to the artificial intelligence model 111. Preprocessing step of the first image and the second image may include at least one of image resizing, image pixel value normalization, image noise removal, image histogram equalization, image embossing, image masking, image cropping, image rotation, image flipping, and image enhancement.

The image processing apparatus may input the pre-processed first image and the pre-processed second image to the artificial intelligence model 111 (S230). The artificial intelligence model 111 may be configured to separate the area of non-interest and the area of interest from the first image when the image processing apparatus simultaneously inputs the first image and the second image to the artificial intelligence model 111. Accordingly, the artificial intelligence model 111 may separate an object in the area of interest other than the area of non-interest in the first image.

The image processing apparatus may receive the resultant image from the artificial intelligence model 111 (S240). The resultant image may be an image that shows the first image, with objects that have been distinguished from the input image.

The image processing apparatus may extract the information on the area of non-interest from the resultant image (S250). For example, the image processing apparatus may handle (or treat) body portion of the vehicle, including tire portion, as the area of non-interest. The image processing apparatus may update the size of the variable area of the second image using the extracted information on the area of non-interest (S260). A process in which the image processing apparatus updates the variable area of the second image will be described later with reference to FIGS. 3 to 5.

Figure 3:
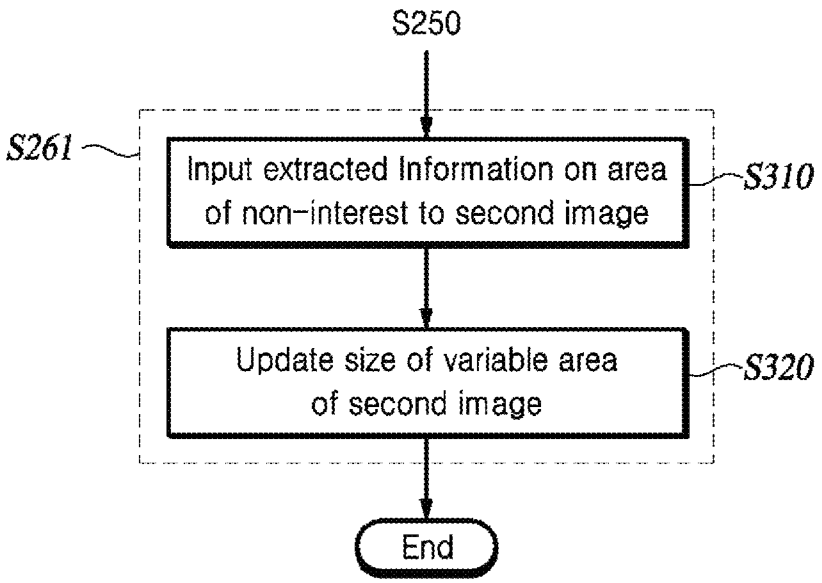
FIG. 3 is a flowchart of an image processing method according to a first embodiment of the present disclosure.

FIG. 3 is a flowchart illustrating a process of updating the variable area of the second image according to the first embodiment of the present disclosure.

Referring to FIG. 3, the image processing apparatus according to the first embodiment of the present disclosure may update the size of the variable area of the second image using the extracted information on the region of non-interest (S260). A process in which the image processing apparatus according to the first embodiment extracts the information on the area of non-interest from the resultant image, and then, updates the variable area of the second image is as follows. The extracted Information on the area of non-interest is input to the second image (S310). More specifically, the image processing apparatus compare with the extracted Information on the area of non-interest and the area of non-interest of the second image. The size of the variable area of the second image is updated (S320). More specifically, the size of the variable area of the second image is updated to be small. As described above, the second image may include the area of non-interest, the area of interest, and the variable area. The size of the variable area of the updated second image may be smaller than the size of the variable area of the second image before update. When the image processing apparatus updates the size of the variable area of the second image several times, the size of the variable area of the second image may be smaller than the size of the variable area of the second image before one update. Accordingly, there is an effect that confidence of a function of distinguishing between the area of non-interest and the area of interest in the image processing apparatus is further increased.

Figure 4:
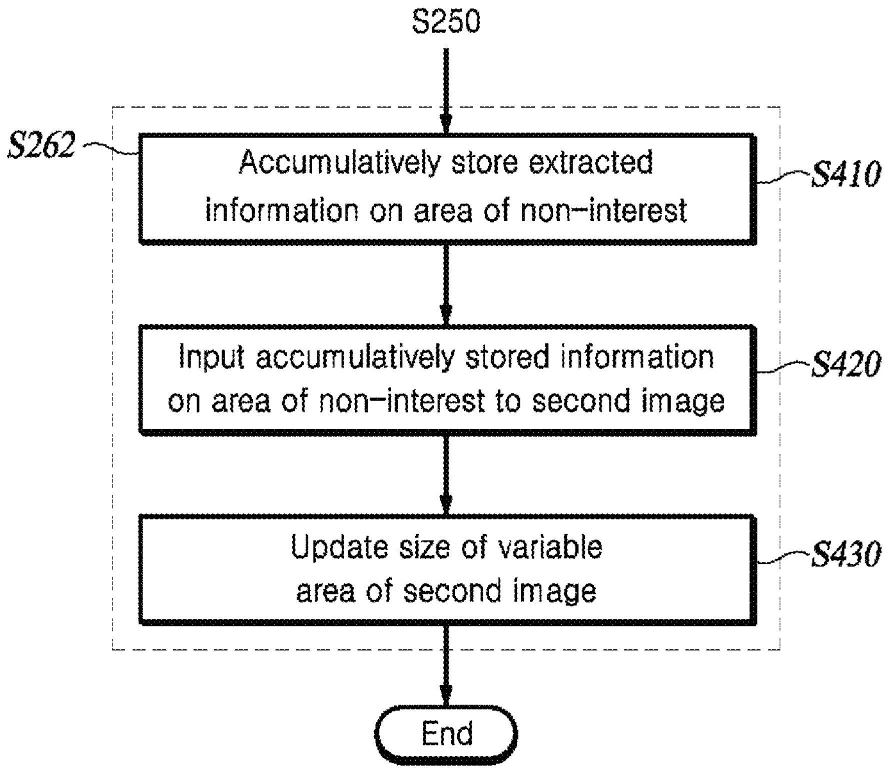
FIG. 4 is a flowchart of an image processing method according to a second embodiment of the present disclosure.

FIG. 4 is a flowchart illustrating a process of updating the variable area of the second image according to a second embodiment of the present disclosure.

Referring to FIG. 4, the image processing apparatus according to the second embodiment of the present disclosure may update the size of the variable area of the second image using the extracted information on the region of non-interest (S260). A process in which the image processing apparatus according to the second embodiment extracts the information on the area of non-interest from the resultant image, and then, updates the variable area of the second image is as follows. The extracted Information on the area of non-interest is accumulatively stored in the memory 120 (S410). The information on the area of non-interest accumulatively stored in the memory 120 is input to the second image (S420). The size of the variable area of the second image is updated (S430). When the second image is continuously updated, there may be a difference in the area of non-interest between respective frames of the updated second image. When there is the difference in the area of non-interest between the respective frames of the second image, this may result in low reliability of distinguishment between the area of non-interest and the area of interest. As another problem, when all the frames of the second image are updated, excessive burden may be placed on the capacity of the memory 120 or the processor 110. Accordingly, the image processing apparatus according to the second embodiment performs a process of accumulatively storing the information on the area of non-interest and then, updating the second image when a certain amount of information is accumulated. The process of accumulating the information on the area of non-interest and inputting the information to the second image to update the second image may be done using Equation 1, Equation 2, and Equation 3.

$$Conf_n \frac{1}{n}\sum_{i=1}^{n} g(Conf_n) \quad \text{Equation 1]}$$

Equation 1 shows the method of calculating the reliability of the recognition result of the artificial intelligence model 111 according to the number of accumulated pieces of information on the area of non-interest. In Equation 1, conf means the reliability of the recognition result of the artificial intelligence model 111. n is a variable indicating the number of the accumulated pieces of information on the area of non-interest. n may be determined through an experiment. g is a function that converts input signal values into output signals. g may be set according to an environment of the image processing apparatus.

$$Conf \leftarrow Conf + (1-\tau)Conf_n \quad \text{Equation 2]}$$

Equation 2 shows a method of updating conf. In Equation 2, $\tau$ denotes a momentum coefficient. $\tau$ is a variable used when updating conf. $\tau$ is a real number between 0 and 1 and may be determined through an experiment.

$$\text{Second image} \leftarrow f(Conf) \quad \text{Equation 3]}$$

Equation 3 shows a process of processing conf through f and inputting the processed conf to the second image. In Equation 3, f is a type of function that processes conf. Using f, a pixel to be input to the second image may be calculated from conf.

Figure 5:
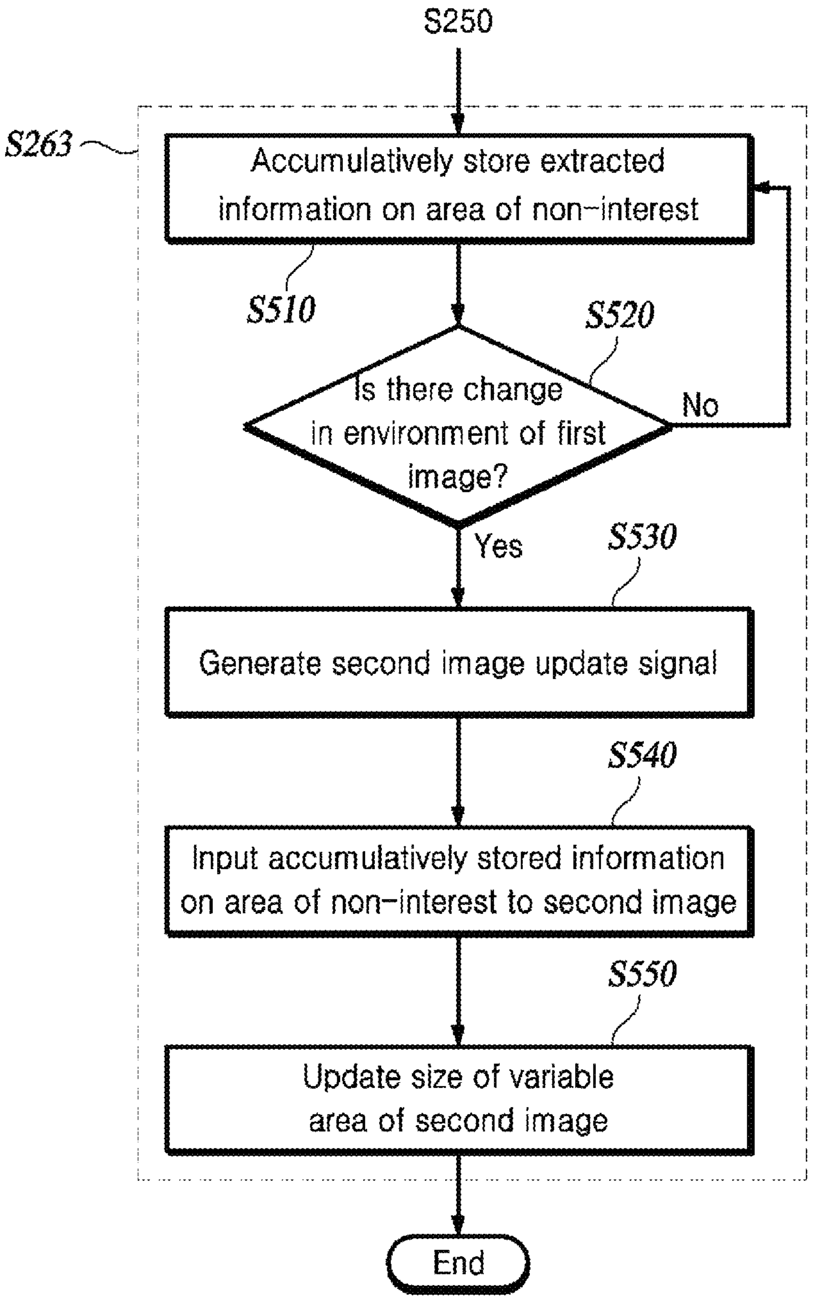
FIG. 5 is a flowchart of an image processing method according to a third embodiment of the present disclosure.

FIG. 5 is a flowchart illustrating a process of updating the variable area of the second image according to a third embodiment of the present disclosure.

Referring to FIG. 5, the image processing apparatus according to the third embodiment of the present disclosure may update the size of the variable area of the second image using the extracted information on the region of non-interest (S260). A process in which the image processing apparatus according to the third embodiment extracts information on the area of non-interest from the resultant image, and then updates the variable area of the second image is as follows. The extracted Information on the area of non-interest is accumulatively stored in the memory 120 (S510). A determination is made as to whether there is a change in environment of the first image (S520). The change in environment of the first image may include change in illuminance of the first image, detection of a vehicle impact, change in vehicle attachment, change in road condition, change in wheel angle, passage of time, and/or the like When a determination is made that there is no drastic change in the environment of the first image, continuously extracted information on the area of non-interest is accumulatively stored in the memory 120 (S510). When a determination is made that there is change in environment of the first image, an update signal for the second image is generated (S530). When the update signal for the second image is generated, the accumulatively stored information on the area of non-interest is input to the second image (S540). The size of the variable area of the second image is updated (S550). Since the process of updating the size of the variable area of the second image using the accumulatively stored information on the area of non-interest may be the same as the process of updating the second image according to the second embodiment of the present disclosure, description thereof is omitted.

Figure 6:
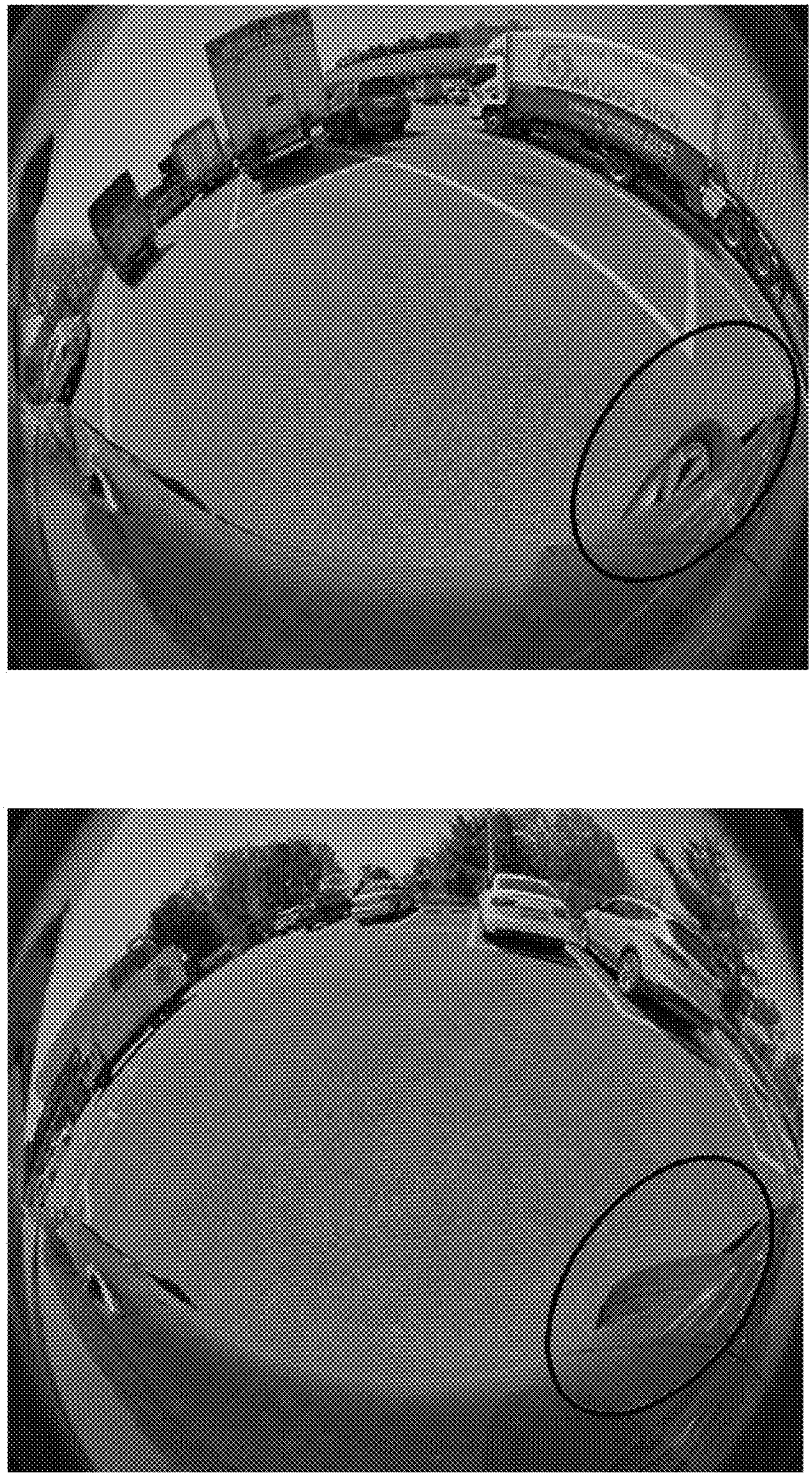
FIG. 6 is a diagram illustrating a situation in which an area of non-interest should be changed.

FIG. 6 is a diagram illustrating a situation in which the area of non-interest should be changed.

Referring to FIG. 6, it may be seen that the area of non-interest of the first image may vary depending on the situation. The object separation target of the first image is an image of the outside of the vehicle. However, the first image is a wide-angle image, and an area of the vehicle body may be photographed. The area of the vehicle body does not need to be the object separation target, and when the area of the vehicle body is the object separation target, an object separation function may be interfered with due to the light reflected on a painted surface of the vehicle body. Therefore, in order to exclude the area of the vehicle body from the object separation target, the first image and the second image containing the information on the area of non-interest are simultaneously input to the artificial intelligence model 111. However, since the area of non-interest may vary depending on the situation as may be seen in FIG. 6, the image processing apparatus according to the present disclosure includes information on the variable area that may be converted into the area of non-interest or the area of interest, in the second image. The image processing apparatus according to the present disclosure may provide information on the area of non-interest with accurate reliability by updating the size of the variable area in real time.

Figure 7:
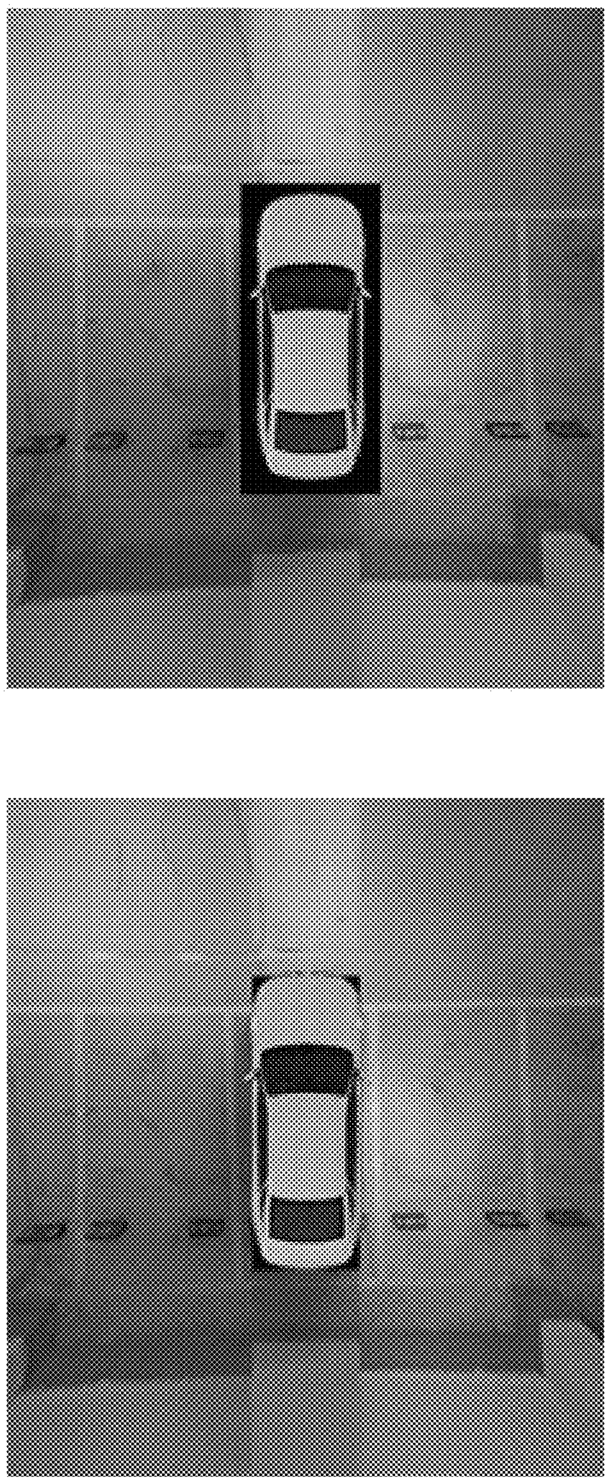
FIG. 7 is a diagram illustrating a comparison between sizes of areas of non-interest when an image is processed according to various embodiments of the present disclosure and when an image is processed according to an existing method.

FIG. 7 is a diagram illustrating a comparison between the sizes of the areas of non-interest when the image is processed according to various embodiments of the present disclosure and when the image is processed according to an existing method. Referring to FIG. 7, a drawing shown at the top of FIG. 7 shows the size of the area of non-interest when the image is processed according to the existing method, and a drawing shown at the bottom of FIG. 7 shows the size of the area of non-interest when the image is processed according to the present disclosure. A black box area around the vehicle illustrated in FIG. 7 is the area of non-interest. When the image is processed according to the existing method, the area of non-interest is set to be large for safety. On the other hand, when the image is processed according to the present disclosure, the area of non-interest can be minimized and a highly reliable area of non-interest can be provided. When the area of non-interest is minimized, object recognition of an object very close to the vehicle may be possible.

Figure 8:
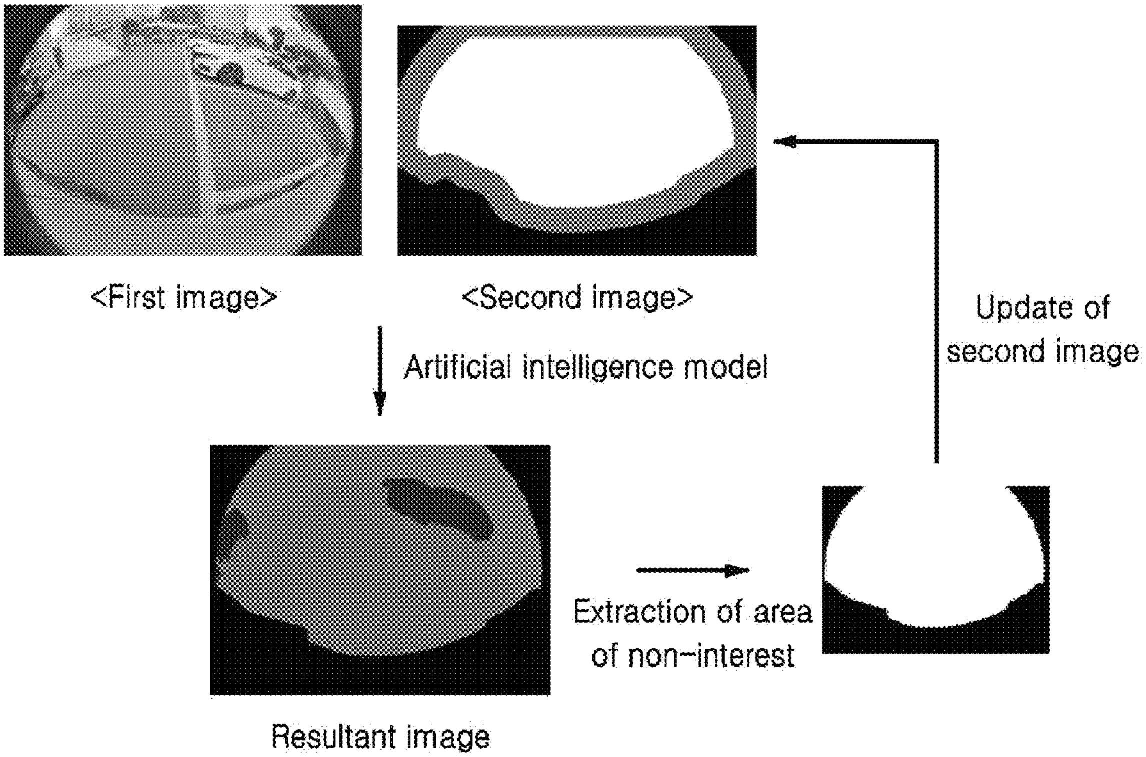
FIG. 8 is a diagram illustrating an image processing process according to various embodiments of the present disclosure.

FIG. 8 is a diagram illustrating an image processing process according to various embodiments of the present disclosure. Referring to FIG. 8, the first image, the second image, the resultant image, and the extracted information on the area of non-interest are visualized. The first image is an image captured by the camera 140 mounted on the vehicle, and a captured image of a road situation and a surrounding vehicle may be seen. The second image includes the information on the area of non-interest, the interest region, and the variable area. In FIG. 8, the area of non-interest corresponds to a black area, the area of interest corresponds to a white area, and the variable area corresponds to a gray area. In the resultant image, the area of interest and the region of non-interest are separated in the first image, and content of object separation for the area of interest in the first image is included. The processor 110 extracts the area of non-interest from the resultant image and updates the second image using the extracted area of non-interest.

Figure 9:
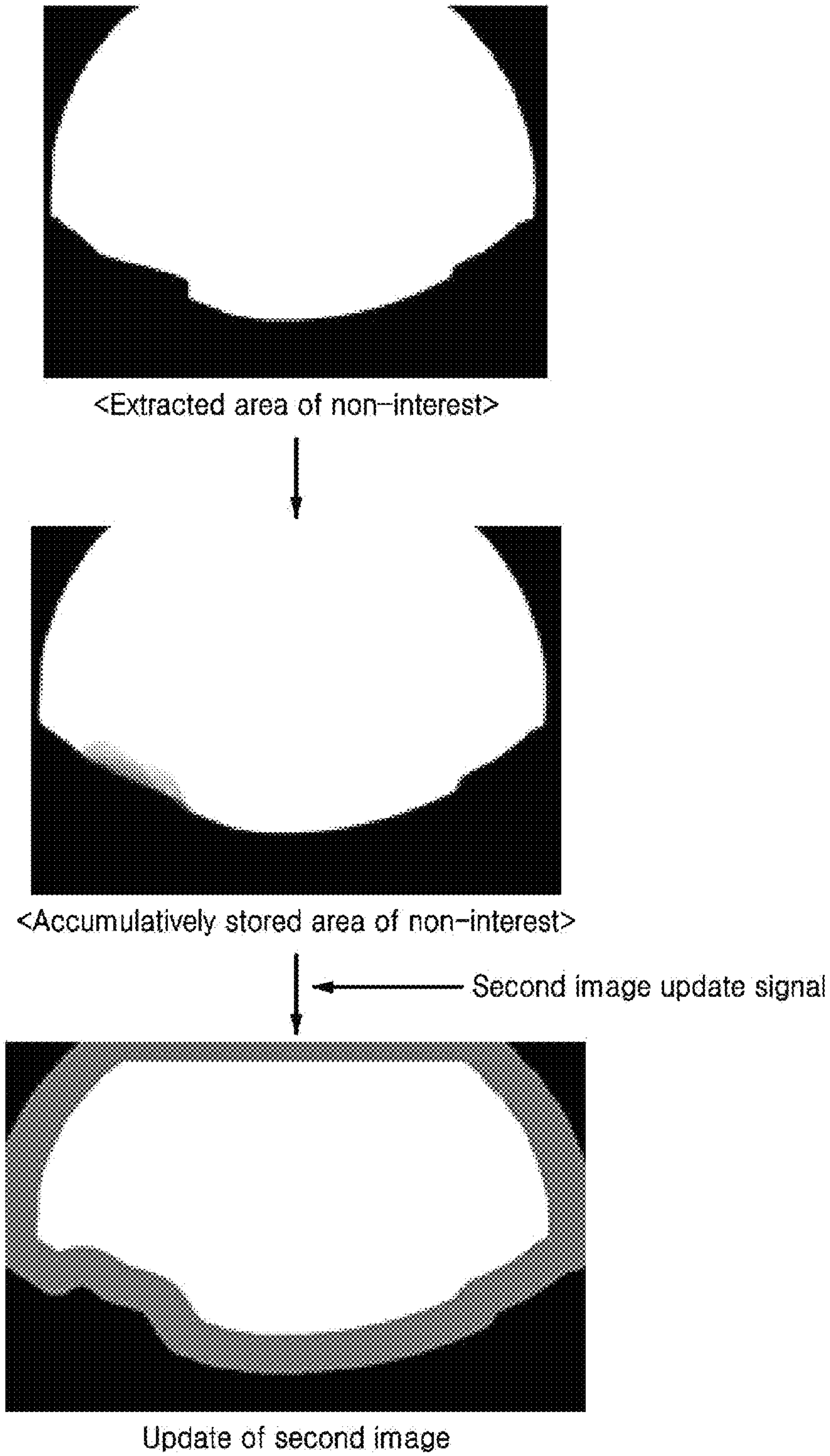
FIG. 9 is a diagram illustrating a process of inputting an accumulatively stored region of non-interest to a second image according to the third embodiment of the present disclosure.

FIG. 9 is a diagram illustrating a process of inputting an accumulatively stored region of non-interest to the second image according to a third embodiment of the present disclosure. Referring to FIG. 9, information on the area of non-interest accumulatively stored in the memory 120 is visualized. The accumulatively stored area of non-interest of FIG. 9 contains information on various areas of non-interest that change as an angle of the wheel changes. It may be seen that an area in which an angle of the wheel changes in the variable area of the second image has been updated to the area of non-interest by updating the second image using the accumulatively stored area of non-interest.

Figure 10:
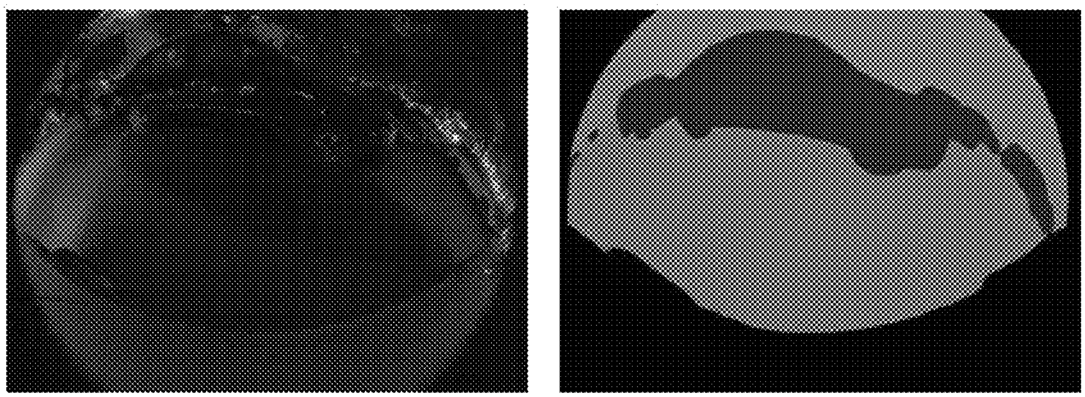
FIG. 10 is a diagram illustrating a resultant image of the image processing apparatus according to various embodiments of the present disclosure.
Figure 10:
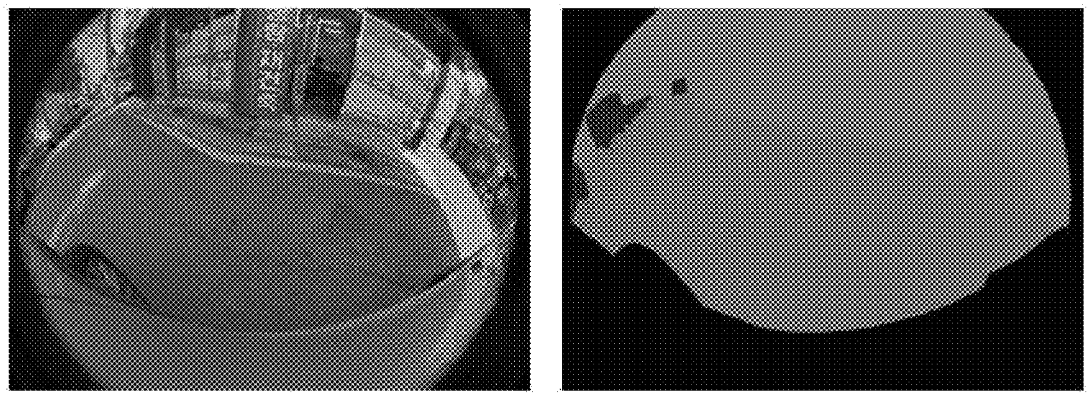

FIG. 10 is a diagram illustrating a resultant image of the image processing apparatus according to various embodiments of the present disclosure. In Case 1, it may be seen that the image processing apparatus according to the present disclosure exhibits highly reliable object separation or recognition results in a situation in which an object separation error easily occurs, which is a state in which illumination around the vehicle is low. In Case 2, it may be seen that the image processing apparatus according to the present disclosure exhibits highly reliable object separation or recognition results in a situation in which an object separation error easily occurs, which is a state in which it is difficult to distinguish between wheels and a road because the wheels and the road have similar colors.

The flowchart of the present disclosure describes processes as being sequentially executed, but this is merely illustrative of the technical idea of an embodiment of the present disclosure. In other words, since it is apparent to those having ordinary skill in the art that an order described in the flowchart may be changed or one or more processes may be executed in parallel without departing from the essential characteristics of an embodiment of the present disclosure, the flowchart is not limited to a time-series order.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An image processing apparatus for distinguishing between an area of interest and an area of non-interest in an image, the image processing apparatus comprising:

a receiver configured to receive a first image captured from at least one camera;

a memory configured to store a second image comprising information on an area of non-interest, an area of interest, and a variable area; and a processor comprising an artificial intelligence model trained to distinguish objects in an area of interest of the first image from an input data comprising the second image and the first image, wherein the processor is configured to extract information on an area of non-interest from a resultant image, outputted by the artificial intelligence model, and update a size of the variable area of the second image using an extracted information on the area of non-interest; and wherein the updated second image is stored in the memory and used as input data with a subsequently received first image.

2. The image processing apparatus of claim 1, wherein the processor is configured to update the size of the variable area of the second image by comparing an overlapping portion with the extracted information on the area of non-interest to the second image.

3. The image processing apparatus of claim 1, wherein the memory is configured to accumulatively store the extracted information on the area of non-interest, and the processor is configured to update the size of the variable area of the second image by inputting an accumulatively stored information on the area of non-interest in the memory to the second image.

4. The image processing apparatus of claim 1, wherein the artificial intelligence model is SSEG (Semantic Segmentation) and is trained using an artificial neural network model.

5. The image processing apparatus of claim 1, wherein the processor is configured to:

generate a second image update signal when a determination is made that an illuminance of the first image changes, and update the size of the variable area of the second image when the second image update signal is generated.

6. The image processing apparatus of claim 1, wherein the memory is configured to accumulatively store the extracted information on the area of non-interest, and the processor is configured to update the size of the variable area of the second image by inputting an accumulatively stored information on the area of non-interest in the memory to the second image, and wherein the updated second image is stored in the memory and used as input data with a subsequently received first image.

7. The image processing apparatus of claim 1, wherein the processor is configured to:

generate a second image update signal when a determination is made that an illuminance of the first image changes, and update the size of the variable area of the second image when the second image update signal is generated, and wherein the updated second image is stored in the memory and used as input data with a subsequently received first image.

8. The image processing apparatus of claim 1, wherein the at least one camera is mounted on a vehicle, and wherein the first image comprises a surrounding image of the vehicle.

9. An image processing method of distinguishing between an area of interest and an area of non-interest in an image using an image processing apparatus, the image processing method comprising:

receiving a first image captured from at least one camera;

preprocessing the first image and a second image that including information on an area of non-interest, an area of interest, and a variable area;

inputting a preprocessed data, comprising the first image and the second image, into an artificial intelligence model;

outputting a resultant image from the artificial intelligence model;

extracting information on an area of non-interest from the resultant image; and updating a size of the variable area of the second image using an extracted information on the area of non-interest, wherein the artificial intelligence model is trained to distinguish objects in the area of interest of the first image from an input data comprising the second image and the first image; and wherein the updated second image is stored in the memory and used as input data with a subsequently received first image.

10. The image processing method of claim 9, wherein the size of the variable area of the second image is updated by comparing an overlapping portion with the extracted information on the area of non-interest to the second image.

11. The image processing method of claim 9, wherein the updating of the size of the variable area of the second image comprises:

accumulatively storing the extracted information on the area of non-interest; and updating the size of the variable area of the second image by inputting an accumulatively stored information on the area of non-interest to the second image.

12. The image processing method of claim 9, wherein the artificial intelligence model is SSEG (Semantic Segmentation) and is trained using an artificial neural network model.

13. The image processing method of claim 9, wherein the updating of the size of the variable area of the second image comprises:

determining whether illuminance of the first image changes;

generating a second image update signal, if the illuminance of the first image changes; and updating the size of the variable area of the second image, if the second image update signal is generated.

* * * * *